Dec. 18, 1934.  A. VAN GASTEL  1,985,197

ELECTRIC LINE PROTECTIVE SYSTEM

Filed Oct. 22, 1932

Inventor
A. van Gastel
by G. J. DeWein
Attorney

Patented Dec. 18, 1934

1,985,197

UNITED STATES PATENT OFFICE 1,985,197

ELECTRIC LINE PROTECTIVE SYSTEM

Albertus van Gastel, Wettingen, Switzerland, assignor to Aktiengesellschaft Brown Boveri & Cie., Baden, Switzerland, a joint-stock company of Switzerland Application October 22, 1932, Serial No. 639,013
In Germany November 30, 1931

7 Claims. (Cl. 172—237)

This invention relates to improvements in electric line ground fault protective systems and more particularly to the reactors utilized for preventing the occurrence of detrimental arcing currents in a transmission line upon accidental grounding of one of the conductors thereof.

It is well known to connect the neutral point of a winding energized from a transmission line to ground through a reactor tuned with the capacities of the line conductors to ground for the operating frequency of the line. The result of such connection is that, upon accidental grounding of one of the conductors of the line, the capacity currents flowing from the other conductors of the line to ground produce, in the reactor, a voltage drop such that the grounded conductor is automatically maintained at ground potential while the neutral point of the winding is maintained at a voltage equal to the phase voltage of the winding. Such result is, however, not accurately obtained because of the resistance of the line, of the winding, of the reactor and of the ground return circuit with the result that the grounded conductor is maintained at a voltage to ground equal to the resistance drops of the capacity currents in their circuits. Such effect may, however, be compensated by connecting with the line an additional reactor which, upon occurrence of a ground, may be excited at a voltage lagging 90 degrees behind the voltage of the grounded conductor. The additional reactor and the associated switching equipment may be connected with a common grounded point of the line, thereby avoiding the necessity for insulating such equipment for the voltage of the transmission line.

It is, therefore, one of the objects of the present invention to provide a protective system for electric power transmission lines including means for compensating the in-phase resistance drop of the capacity currents in the line upon grounding of one of the conductors thereof.

Another object of the present invention is to provide a protective system for transmission lines in which a non-energized reactor and an energized reactor cooperate to maintain one of the conductors thereof at ground potential upon accidental grounding of such conductor.

Another object of the present invention is to provide a protective system for transmission lines including a reactor which may be energized at a voltage lagging 90 degrees behind the voltage of an accidentally grounded conductor of the line.

Figure 1:
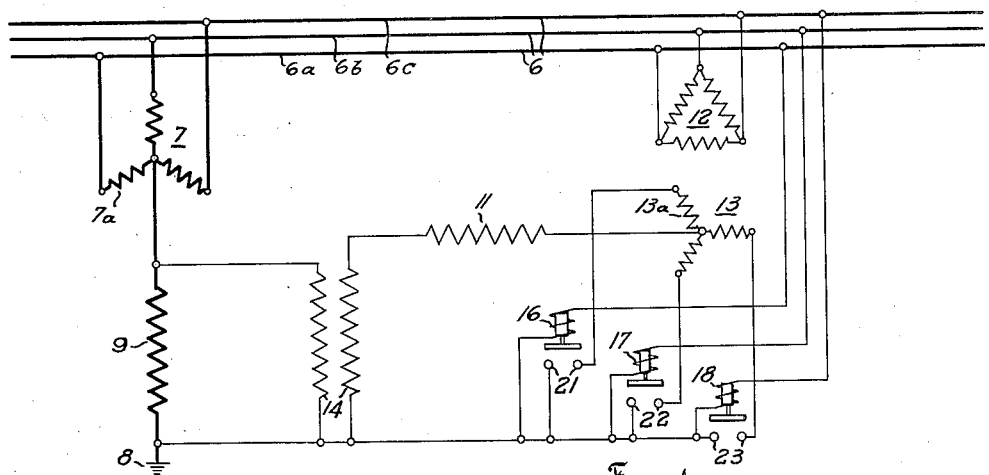
Figure 2:
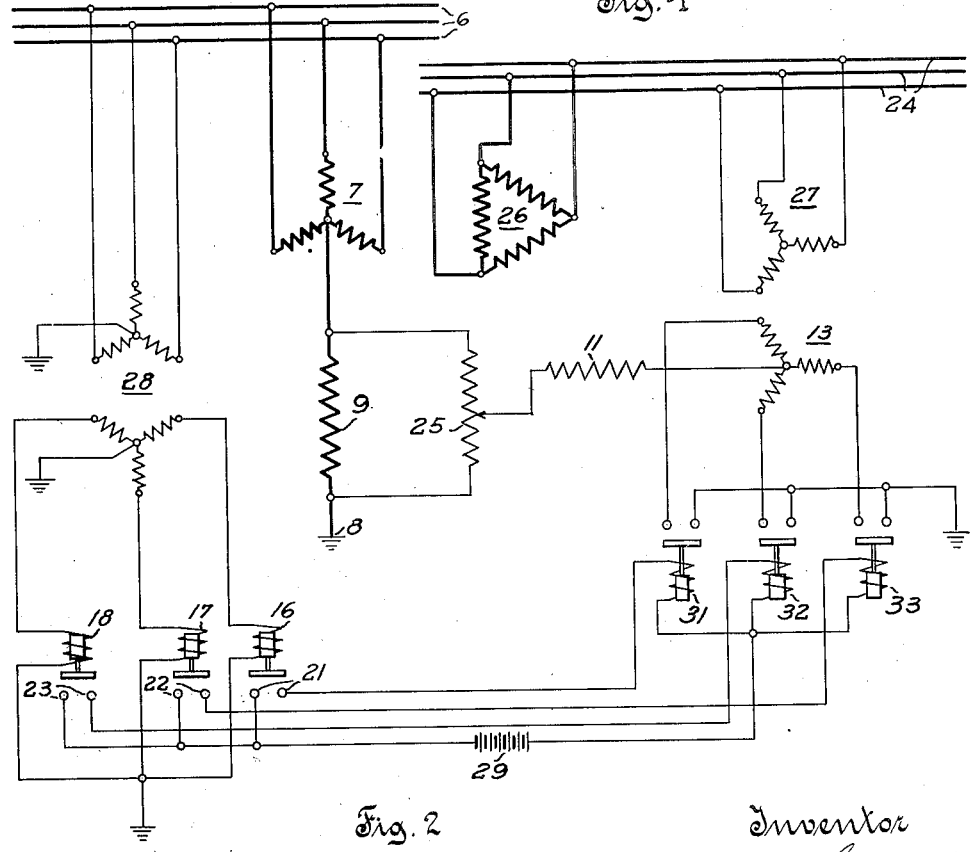

Objects and advantages other than those above described will be apparent from the following description when read in connection with the accompanying drawing, in which Fig. 1 diagrammatically illustrates one embodiment of the present invention applied to a three-phase transmission line and in which a reactor may be energized through a transformer from the transmission line itself; and Fig. 2 diagrammatically illustrates a modified embodiment of the present invention in which the reactor may be energized from an auxiliary line connected with the transmission line to be protected.

Referring more particularly to the drawing by characters of reference, reference numeral 6 designates the transmission line to be protected herein shown as a three-phase line, such type of line being most frequently utilized in practice. Line 6 may energize a winding 7 comprising several portions interconnected to form a neutral point connected to ground at 8 through a reactor 9. Winding 7 may be the high voltage winding of a transformer or the armature winding of an alternating current motor and may also be a winding of a generator or of a transformer energizing line 6. Reactor 9 is tuned with the capacities of the conductors of line 6 to ground for a frequency which is most frequently the operating frequency of the line. A second reactor 11 is connected with the neutral point of a star connected secondary winding 13 of an auxiliary transformer having a delta connected primary winding 12 energized from line 6. Reactor 11 is connected in series with the primary winding of a transformer 14 having a secondary winding connected across the terminals of reactor 9. The circuit of reactor 11 is normally open and may be closed through contacts 21, 22 or 23 of no-voltage relays 16, 17 and 18.

In operation, assuming that line 6 is not subject to any disturbance, the neutral point of winding 7 is automatically maintained at ground potential through its connection to ground at 8 through reactor 9. In general the capacities of the several conductors 6a, 6b and 6c of line 6 to ground are equal, so that capacity currents flowing therethrough cancel each other and do not return through reactor 9. Each of the conductors of line 6 are at phase potential to ground so that the coils of relays 16, 17 and 18 are all energized and contacts 21, 22 and 23 are open. Upon accidental grounding of one of the conductors of line 6 such as 6a, capacity currents flow from winding 7 over conductors 6b and 6c to ground to point 8 and over reactor 9 to the neutral point of winding 7. As is well known in the art, because of the tuning of reactor 9, the voltage drop in such reactor due to the flow of the capacity currents is equal to the voltage of portion 7a of winding 7 connected with conductor 6a. Such voltage drop is, however, not exactly in phase with the voltage of winding portion 7a due to the resistance drop of the capacity currents in winding 7, line 6, ground and reactor 9. Conductor 6a is thus continually maintained at a potential to ground equal to the sum of the resistance drops in the circuits of the capacity currents while the neutral point of winding 7 is maintained at a potential to ground slightly different from the voltage of winding portion 7a.

Conductor 6a being at a much lower voltage to ground than the normal voltage thereof, relay 16 is insufficiently energized and closes its contacts 21. Reactor 11 is then energized from portion 13a of winding 13 over contacts 21 and the primary winding of transformer 14 at a voltage lagging by 90 degrees behind the voltage of conductor 6a. Reactor 11 then receives a current lagging by 90 degrees behind the voltage of winding portion 13a and, therefore, lagging by 180 degrees behind the voltage of winding portion 7a. The flow of such current in the primary winding of transformer 14 induces a similar current in the secondary winding thereof and in reactor 9 wherein it produces a voltage drop compensating the resistance drop due to the flow of capacity currents in their respective circuits. Conductor 6a is thus no longer maintained at a voltage to ground equal to such resistance drop and is then accordingly maintained at ground potential. Any arcing due to the accidental contact of conductor 6a with ground cannot be sustained any longer and the conductor 6a may remain in contact with ground indefinitely without any injurious effect. Upon removal of the grounding connection the voltage relations of the conductors of line 6 with ground will gradually resume their normal values.

In the embodiment illustrated in Fig. 2, winding 7 is assumed to be the primary winding of a transformer having a delta connected secondary winding 26 supplying an auxiliary line 24. Reactor 11 may be connected with reactor 9 through a transformer such as 14 as shown in the embodiment of Fig. 1 or may be connected through an auto-transformer 25 so as to reduce the cost of the installation. Auto-transformer 25 may be provided with taps to permit adjustment of the voltage induced in reactor 9 by the flow of current through reactor 11 and auto-transformer 25. The delta connected winding 12 shown in Fig. 1 is replaced in Fig. 2 by a star connected winding 27 to maintain the proper phase relation between the voltages of winding 7 and of winding 13. To more completely separate the switching equipment from high voltage conductors, relays 16, 17 and 18 are connected with line 6 through a potential transformer 28. In the present embodiment it is assumed that contacts 21, 22 and 23 of relays 16, 17 and 18 are not capable of carrying the currents of winding 13 and are, therefore, utilized for energizing auxiliary contactors 31, 32 and 33 from a battery 29. The contactors connect the several portions of winding 13 with ground as in the embodiment of Fig. 1.

The operation of the present embodiment is entirely similar to that of the embodiment shown in Fig. 1. Although the system of the present embodiment is more complicated and, therefore, more expensive than the system illustrated in Fig. 1, the present system may be advantageous when line 6 is energized at very high voltages so that the cost of an auxiliary transformer such as 12, 13 adapted to be connected with line 6 would become prohibitive. In addition, although relays 16, 17 and 18 are connected to ground in the embodiment shown in Fig. 1, such relays will receive any surges present in line 6 and may easily be damaged thereby. This disadvantage is avoided by the insertion of potential transformer 28.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a protective system for electric transmission lines having a neutral point, a reactor continuously connecting the neutral point of the line with ground and forming a portion of a circuit for the flow of capacitance charging currents between the line and the ground, a reactor arranged for connection with the first said reactor and with the line, and means for connecting the second said reactor with the line to energize the first said reactor upon grounding of one of the conductors of the line, the first said reactor being thereby energized at a potential component lagging 90 degrees relative to the potential of the grounded conductor of the line to compensate for the in-phase resistance drop of the capacitance charging currents flowing in the circuit including the first said reactor.

2. In a protective system for electric transmission lines having a neutral point, a reactor connecting the neutral point of the line with ground and forming a portion of a circuit for the flow of capacitance charging currents between the line and the ground, a reactor arranged for connection with the first said reactor and with the line, a transformer arranged to operably connect the second said reactor with the line to thereby energize the first said reactor at a potential component lagging relative to the potential of the grounded conductor of the line, and means for establishing said connection of the second said reactor and said transformer only upon grounding of one of the conductors of the line.

3. In a protective system for electric transmission lines having a neutral point, a reactor continuously connecting the neutral point of the line with ground and forming a portion of a circuit for the flow of capacitance charging currents beteewn the line and the ground, a reactor arranged for connection with the first said reactor and with the line, a transformer arranged to operably connect the second said reactor with the line to thereby energize said reactor at a potential lagging relative to the potential of the grounded conductor of the line, and relays for connecting said reactor and said transformer only upon grounding of one of the conductors of the line to compensate for the resistance drop of the capacitance charging currents flowing in the circuit including the first said reactor.

4. In a protective system for electric transmission lines having a neutral point, a reactor continuously connecting the neutral point of the line with ground and forming a portion of a circuit for the flow of capacitance charging currents between the line and the ground, a transformer connected with the line and having a winding with a neutral point, a reactor connected with the neutral point of said transformer winding and arranged to be also connected with the terminals of the said winding, and relays for severally connecting said reactors with the terminals of said winding dependent upon the grounding of the line.

5. In a protective system for electric transmission lines having a neutral point, a reactor connecting the neutral point of the line with ground and forming a portion of a circuit for the flow of capacitance charging currents between the line and the ground, a transformer connected with the line and having a winding with a neutral point, a reactor connected with the neutral point of said winding and arranged to be also connected with the terminals of said winding, a transformer connecting said reactors, and relays for severally connecting the last said reactor with the terminals of said winding dependent upon the grounding of the line.

6. In a protective system for electric transmission lines having a neutral point, a reactor connecting the neutral point of the line with ground and forming a portion of a circuit for the flow of capacitance charging currents between the line and the ground, a transformer connected with the line and having a winding with a neutral point, a reactor connected with the neutral point of said winding and arranged to be also connected with the terminals of the said winding, relays for severally controlling the connection of the last said reactor with the terminals of the said winding dependent upon the grounding of the line, and a transformer connecting the coils of said relays with the line.

7. In a protective system for electric transmission lines having a neutral point, a reactor connecting the neutral point of the line with ground and forming a portion of a circuit for the flow of capacitance charging currents between the line and the ground, a transformer connected with the line and having a winding with a neutral point, a reactor connected with the neutral point of said winding and arranged to be also connected with the terminals of said winding, a transformer connecting said reactors, relays for severally connecting the last said reactor with the terminals of said winding dependent upon the grounding of the line, and a transformer connecting the coils of said relays with the line.

ALBERTUS van GASTEL.